United States Patent
Shatdal (12)

(10) Patent No.: US 9,015,187 B1
(45) Date of Patent: Apr. 21, 2015

(54) MAPPING TABLE ROWS TO CHARACTERS

(75) Inventor: Ambuj Shatdal, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 1416 days.

(21) Appl. No.: 11/983,261

(22) Filed: Nov. 8, 2007

(51) Int. Cl.
*G06F 17/30* (2006.01)

(52) U.S. Cl.
CPC ................... *G06F 17/30103* (2013.01)

(58) Field of Classification Search
USPC ................................. 707/769, 776
See application file for complete search history.

(56) References Cited

U.S. PATENT DOCUMENTS

2003/0084031 A1 *  5/2003  Tarquini ............................ 707/3
2003/0233347 A1 * 12/2003  Weinberg et al. ................. 707/3

OTHER PUBLICATIONS

J.R. Groff et al., "SQL: The Complete Reference," Chapter 9, Subqueries and Query Expressions, pp. 217-268 (1999).

* cited by examiner

*Primary Examiner* — Alex Gofman
(74) *Attorney, Agent, or Firm* — Trop, Pruner & Hu, P.C.

(57) ABSTRACT

Table rows are mapped to corresponding characters, where the mapping produces a collection of the characters. A query is received to identify a pattern in the table rows. The collection of the characters is accessed to process the query.

23 Claims, 3 Drawing Sheets

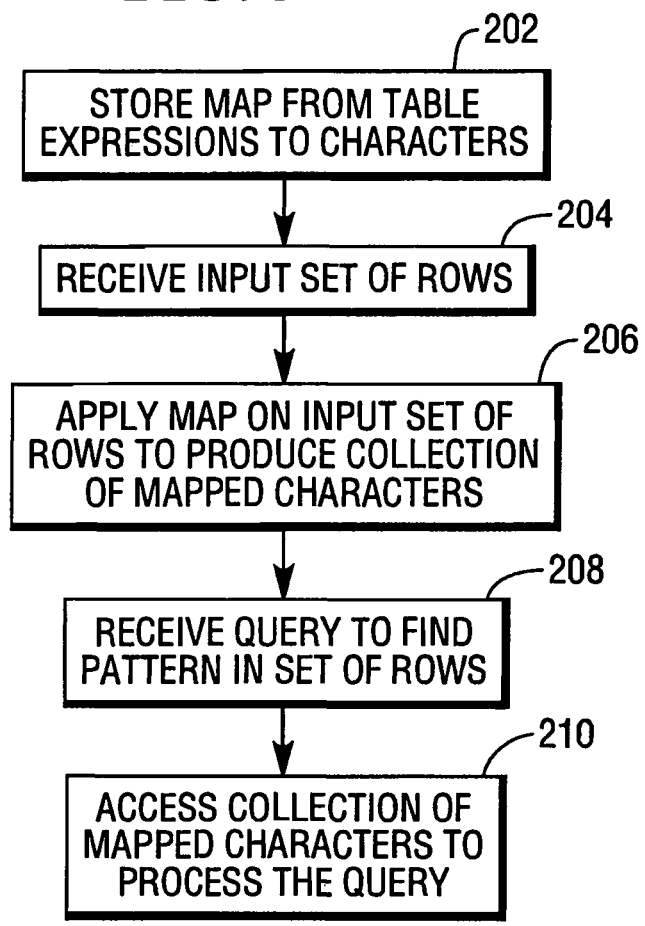

MAPPING TABLE ROWS TO CHARACTERS

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table. Examples of SQL statements include INSERT, SELECT, UPDATE, and DELETE.

Relational tables in some databases can be quite large, with some tables having millions of rows of data. Accessing such large tables when processing queries can be time-consuming and computational-intensive. Although traditional SQL statements provide for good flexibility in accessing data contained in tables, such SQL statements typically do not provide a convenient way of recognizing patterns that may be present in tables.

SUMMARY

In general, according to an embodiment, a technique or mechanism is provided that maps table rows to corresponding characters, where the mapping produces a collection of the characters. In response to a query to identify a pattern in the table, the collection of the characters is accessed to process the query.

Other or alternative features will become more apparent from the following description, from the drawings, and from the claims.

BRIEF DESCRIPTION OF THE DRAWINGS

FIG. 3 is a flow diagram of a process according to an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
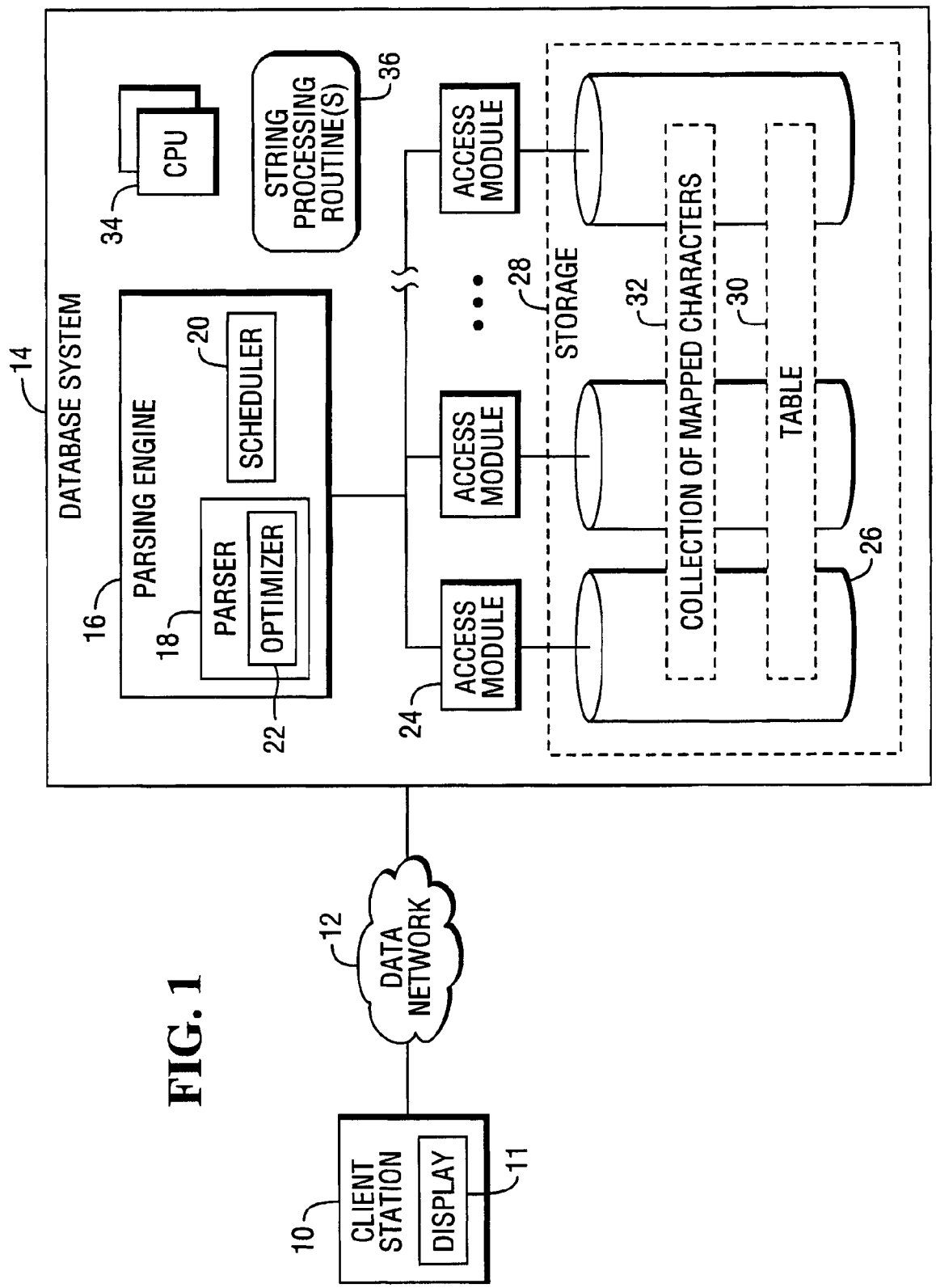
FIG. 1 is a block diagram of an example arrangement that includes a database system according to an embodiment.

FIG. 1 illustrates an example arrangement in which a client station (or plural client stations) 10 is (are) coupled to a database system 14 over a data network 12. Examples of the data network 12 include a local area network (LAN), a wide area network (WAN), the Internet, and so forth. The client station 10 is capable of issuing queries according to a standard database query language to the database system 14 to access or update data or to create or alter data structures (e.g., tables, rows, and so forth). One example of a standard database query language is the Structured Query Language (SQL), as promulgated by the American National Standards Institute (ANSI).

In addition to being able to issue standard database queries, the client station 10 is also capable of submitting queries for identifying a pattern in a table contained in the databases system 14. As explained in further detail below, processing of such queries uses a collection (e.g., string or sequence) of characters (e.g., 32 in FIG. 1) that are mapped from rows of the table. The use of such queries provides for enhanced flexibility in how data contained in the database system 14 can be accessed. As used here, the term "table" can refer to a relational table, a segment of a relational table, or any other collection of tuples (rows).

In response to certain queries, the database system 14 can output results from the database system 14 to the client station 10. Such results output by the database system 14 can be presented for display in a display device 11 associated with the client station 10.

The database system 14 includes a storage subsystem 28 that stores various data, including a table 30. The storage subsystem 28 includes plural storage modules 26, which can be physical storage devices or logical representations of partitions of the storage subsystem 28.

The database system 14 also includes a parsing engine 16, which has a parser 18 and a scheduler 20. The parser 18 receives database queries (such as those submitted by the client system 10), parses the received query, and generates executable steps. The parser 18 includes an optimizer 22 that generates query plans, selecting the most efficient from among the plural query plans. The scheduler 20 sends the executable steps generated by the parser 18 to multiple access modules 24 in the database system. The parser 18 can invoke one or more string processing routines 36 when processing certain types of queries to perform string searches in one or more collections of characters 32 mapped from table rows.

Each access module 24 can perform the following tasks: inserts, deletes, or modifies contents of tables; creates, modifies, or deletes definitions of tables; retrieves information from definitions and tables; and locks databases and tables. In one example, each access module 24 is based on an access module processor (AMP) used in some TERADATA® database systems from Teradata Corporation (formerly a division of NCR Corporation). Each access module 24 manages access of data in respective storage modules 26. The presence of multiple access modules 24 and corresponding storage modules 26 define a parallel database system. In alternative embodiments, instead of database systems having multiple access modules, a database system with only one access module can be employed.

The access modules 24 and parsing engine 16 are part of the database software executable in the database system 14. The database software, along with the string processing routine(s) 36, are executable on one or more central processing units (CPUs) 34 of the database system 14. In the example of FIG. 1, the components of the database system 14 are depicted as being part of one node. Note that the database system 14 can actually be implemented in a multi-node system where each node contains one or more access modules 24 and parsing engines 16 to provide a distributed database system architecture.

As depicted in the example of FIG. 1, the table 30 is stored in the storage subsystem 28. In the parallel environment, the table 30 is distributed across multiple storage modules 26 (with different portions of the table 30 stored in different ones of the storage modules 26). In accordance with some embodiments, a map that correlates table expressions associated with the table 30 to characters is provided. Table expressions can be defined on the table 30, where a table expression can be any expression that involves at least one attribute of the table 30. For example, the table expression can refer to a condition (e.g., inequality condition, equality condition, etc.) specified against a value of a given attribute (or given attributes) of the table 30. An example of an inequality condition is C1>20, where C1 is an attribute of the table. Alternatively, the table expression can be more complex, and can include functions (e.g., aggregate functions such as sum functions, average functions, etc.) defined on one or more attributes of the table 30.

The map (that correlates table expressions to characters) is used to map rows of the table 30 to a collection of mapped characters 32. The string processing routine 36 can then be invoked to perform a string search in the collection of mapped characters 32 to identify patterns in the base table 30.

Figure 2:
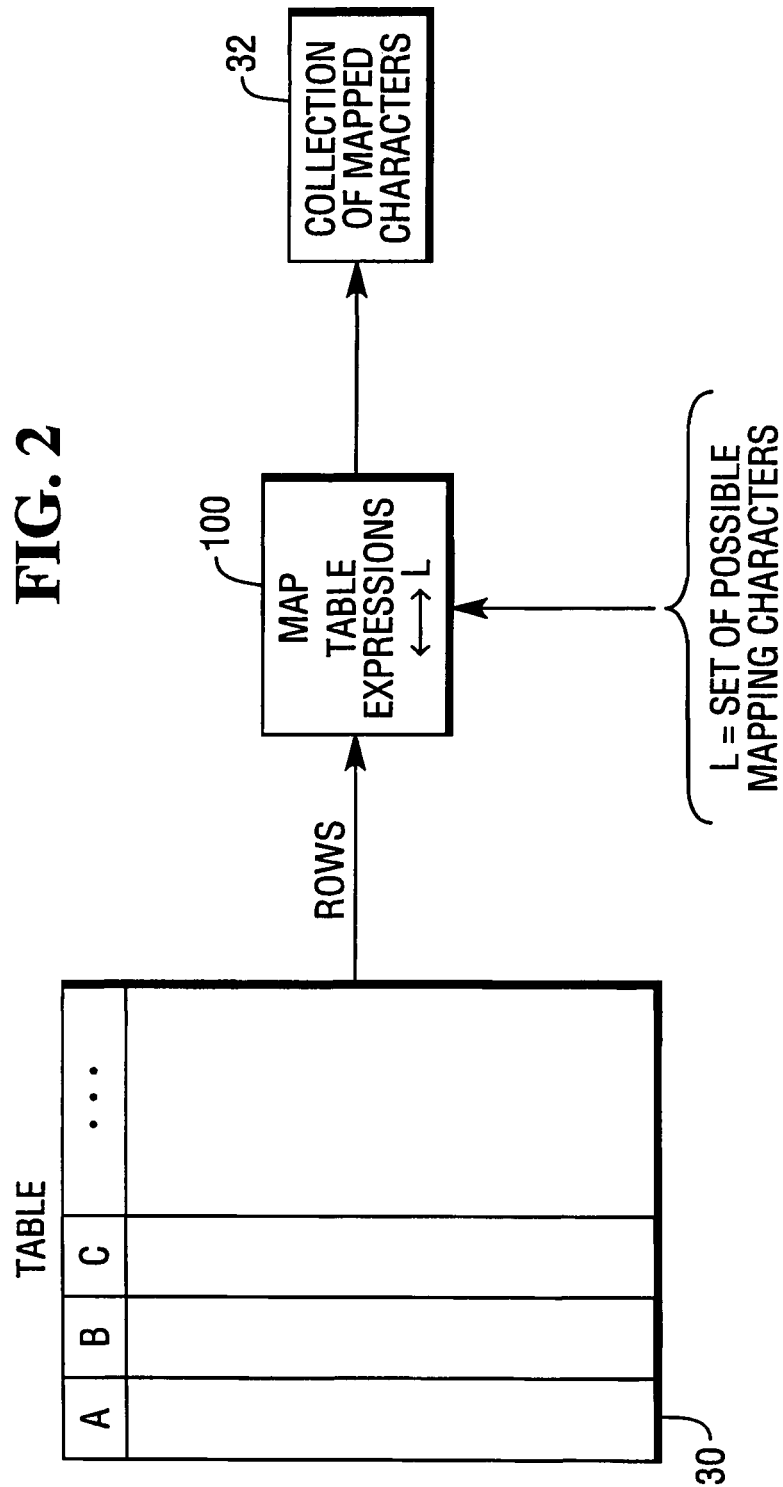
FIG. 2 illustrates mapping of table rows to a collection of characters that represent the table rows, in accordance with an embodiment.

FIG. 2 shows an example mapping of rows of the table 30 to the collection of mapped characters 32. The table 30 can have plural attributes, such as attributes A, B, C, and so forth. The attributes A, B, C, and so forth, are columns in the table 30, which also includes rows corresponding to different records.

A map 100 correlates table expressions to characters from a set L of possible mapping characters. The set L of possible mapping characters represents all possible characters to which table expressions can be mapped. For example, the possible characters can include alphabet characters, number characters, or any other characters, such as symbols (e.g., ?, !, etc.), and so forth. As depicted in FIG. 2, the map 100 is used to map rows of the table 30 to the collection of mapped characters 32.

An example of the mapping that can be performed is provided below.

Let L={A, B, C, D, . . . } define a set of possible characters, which in this case includes alphabet characters. Then a map M (100 in FIG. 2) can be defined that uniquely maps each row of the base table to one of the characters in the alphabet. This implies two requirements (in one example implementation): (1) the row must map to one and only one character in the alphabet; and (2) all rows must have a mapping in the alphabet. Then a set of rows would map to a collection of alphabet characters, which can be a sequence or string of characters. In other words, M(row)=x, where x∈L.

A simple example is considered below, where the map M can be as follows (C1 is a column of a set of rows in a table):

| | |
|---|---|
| C1 < 100 | = A |
| 100 ≥ C1 > 1000 | = B |
| 1000 ≥ C1 | = C |
| Default | = D |

In the example mapping above, table expressions (C1<100, 100≥C1>1000, etc.) are correlated to corresponding characters A, B, C, or D. The example table rows are as follows:

| | | |
|---|---|---|
| 10 | a | NY |
| 1001 | b | NY |
| 100 | c | NY |
| 101 | d | CA |

The mapping from the rows to the characters using the map M results in a sequence ACBB.

Note that any function that returns a unique value for the row, e.g., a scalar or a function (e.g., window function), can be used in the map M. In the above, the map M maps a scalar (e.g., A, B, C, D) to a row depending on the value of column C1. Alternatively, instead of mapping the scalar to the row based on the value of C1, a function can be mapped to a row based on the value of C1, where the output of the function produces a character.

In performing a mapping from a table row to a character, the map M can be accessed in sequence, such that the first entry of the map M that evaluates to "True" is used to perform the mapping of the table row to the corresponding character.

A more complex version of the simple example map M above is as follows:

| | |
|---|---|
| C1 < 100 | = A |
| !(C1 < 100) && (100 C1 ≥ 1000) | = B |
| !(C1 < 100) && !(100 Cl ≥ 1000) && (1000 ≥ C1) | = C |
| !(C1 < 100) && !(100 Cl ≥ 1000) && !(1000 ≥ C1) | = D |

Based on the collection of characters produced from the map M, certain queries can be processed using the collection of characters, such as queries that seek to find certain patterns in the base table. In other words, in processing such a query, a character search or string search is performed in the collection of characters to find some target pattern.

One example can be in the context of a time series of data points, where the example time series can represent revenue over time, profit over time, network performance data collected over time, etc. The data points in the time series can be provided as a series of rows, which can then be mapped using the map 100 to a collection of characters. Then, using string operations based on the collection of characters, patterns (of the characters) can be identified. Patterns can include a sequence of some number of a certain character(s) (e.g., alphabet letter "A"). Such a sequence of some number can indicate, as examples, some persistent period of a certain characteristic (e.g., high revenue, low profit, high network traffic, etc.) in the time series. In one example, the string query can look for a sequence of a particular character, such as a sequence of AAA . . . values.

The example map M given above is based on inequality conditions on a particular attribute (C1). In a different example, the map M can be based on a function (e.g., aggregate function) of a particular attribute, such as the following:

A=MAVG(val, 30, day)<val

B=default

In the example above, val is the attribute of interest. The moving average function MAVG (which is an example of an aggregate function) calculates the 30-day moving average of val. In the above map, if the value of attribute val is greater than the 30-day moving average of val, then that is mapped to the character A. Anything else is mapped to the character B. In other words, "MAVG(val, 30, day)<val" is a table expression that is mapped to A. The condition "default" is another table expression that is mapped to the character B.

To find the first set of rows that has three consecutive values where the value of attribute val is greater than the 30-day moving average of val, a query can specify a search for "AAA." The string search for "AAA" can take advantage of existing functions that may be available in the database system, such as the C-library "STRSTR" function. An example syntax for searching for "AAA" using the STRSTR function can be as follows:

SELECT STRSTR((A:MAVG(val, 30, day)<val, B: default), "AAA") FROM set_of_rows, where set_of_rows refers to the set of rows being considered (which can be a set of rows from table 30). The above query will return a first triplet of rows from set_of_rows that meets the requested search condition.

The string search can use any other regular expressions on strings or any other complex string search or other operations.

FIG. 3 illustrates a process according to an embodiment. A map (e.g., 100 in FIG. 2) is stored (at 202), where the map correlates table expressions to characters that are members of a set L. An input set of rows is received (at 204), where the input set of rows can be rows retrieved from a base table or a set of rows received from another source (e.g., over a network, from a removable storage medium, etc). The stored map is applied (at 206) on the input set of rows to produce a collection of mapped characters (e.g., 32 in FIGS. 1, 2).

Next, a query is received (at 208) to find a pattern in the set of rows. To process the query, a string processing routine 36 (FIG. 1) is invoked, where the string processing routine 36 accesses (at 210) the collection of mapped characters to find a target pattern. Processing of the query produces output results, which can be provided as output to the client station 10 depicted in FIG. 1. The output results include rows of the table that correspond to the characters matching the string of one or more predetermined characters. For example, if the string of characters to be searched is "AAA," then the three rows (or some portion of the three rows) corresponding to the string "AAA" will be returned as the output results.

Instructions of the various software routines or modules discussed herein (such as the parsing engines 16, access modules 24, and string processing routine(s) 36) are loaded for execution on corresponding processors (such as CPUs 34 in FIG. 1). The processors include microprocessors, microcontrollers, processor modules or subsystems (including one or more microprocessors or microcontrollers), or other control or computing devices. As used here, a "processor" can refer to a single component or to plural components.

Data and instructions (of the various software modules and layers) are stored in one or more storage devices, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by at least one processor in a database system, comprising:
   providing a map that correlates expressions including at least one condition on at least one attribute in a table to corresponding characters;
   mapping, using the map by the at least one processor, table rows of the table to corresponding ones of the characters, wherein the mapping produces a string of the characters, wherein the mapping comprises evaluating the expressions against values of the at least one attribute in corresponding ones of the table rows of the table, identifying respective ones of the characters according to the evaluating, and adding the identified characters to the string;
   receiving, by the at least one processor, a query to identify a pattern in the table rows; and
   accessing, by the at least one processor, the string of the characters to process the query, wherein processing the query comprises performing a string search in the string of characters, rather than a search in the table, to identify the pattern.

2. The method of claim 1, wherein the at least one condition on the at least one attribute comprises at least one of an inequality condition and an equality condition.

3. The method of claim 1, wherein mapping the table rows to corresponding ones of the characters comprises mapping the table rows to characters including at least one of alphabet letters, numbers, and symbols.

4. The method of claim 1, wherein receiving the query to identify the pattern in the table rows comprises receiving the query to identify a sequence of consecutive predetermined characters, wherein the pattern includes the sequence of the consecutive predetermined characters.

5. The method of claim 4, wherein performing the string search comprises accessing the string of the characters to perform a string search for the sequence of consecutive predetermined characters.

6. The method of claim 5, further comprising, based on the string search, identifying table rows that match the sequence of consecutive predetermined characters.

7. The method of claim 6, further comprising outputting at least a portion of the identified table rows to a client station that issued the query.

8. The method of claim 1, wherein the string of characters is in a collection that is separate from the table.

9. The method of claim 1, wherein the evaluating comprises:
   determining that a first of the table rows satisfies a first of the expressions, and determining that a second of the table rows satisfies a second of the expressions; wherein the identifying comprises:
   identifying a first of the characters for the first table row, and
   identifying a second of the characters for the second table row; and
   wherein the adding comprises adding the first and second characters to the string.

10. The method of claim 1, wherein the map includes plural entries correlating the expressions to corresponding ones of the characters, wherein a first of the entries contains a first of the expressions and a first of the characters, and a second of the entries contains a second of the expressions and a second of the characters.

11. An article comprising at least one computer-readable storage medium containing instructions that when executed cause at least one processor in a database system to:
   store a map that correlates expressions including at least one condition or at least one function on at least one attribute to corresponding characters;
   receive a set of rows from a table, where the set of rows includes the at least one attribute;
   use the map to map the set of rows to a string of characters, wherein mapping the set of rows to the string of characters comprises evaluating the expressions against values of the at least one attribute in corresponding ones of the rows in the set, identifying respective ones of the characters according to the evaluating, and adding the identified characters to the string;
   receive a query to identify a pattern in the set of rows; and
   access the string of the characters to process the query, wherein processing the query comprises performing a string search in the string of characters to identify the pattern.

12. The article of claim 11, wherein the at least one condition comprises at least one of an inequality condition and an equality condition.

13. The article of claim 11, wherein the at least one function is an aggregate function.

14. The article of claim 11, wherein receiving the query comprises receiving the query to identify the pattern that includes a sequence of consecutive predetermined characters.

15. The article of claim 14, wherein performing the string search comprises performing the string search in the string for the sequence of consecutive predetermined characters.

16. The article of claim 15, wherein performing the string search in the string of the characters for the sequence of consecutive predetermined characters uses a C-library string function.

17. The article of claim 11, wherein the string of characters is in a collection that is separate from the table, and wherein processing the query comprises performing the string search in the string of characters rather than a search of the table.

18. The article of claim 11, wherein the evaluating comprises:
determining that a first of the rows in the set satisfies a first of the expressions, and determining that a second of the rows in the set satisfies a second of the expressions; wherein the identifying comprises:
identifying a first of the characters for the first row, and
identifying a second of the characters for the second row; and
wherein the adding comprises adding the first and second characters to the string.

19. The article of claim 11, wherein the map includes plural entries correlating the expressions to corresponding ones of the characters, wherein a first of the entries contains a first of the expressions and a first of the characters, and a second of the entries contains a second of the expressions and a second of the characters.

20. A database system comprising:
a storage to store a table; and
at least one processor to:
store a map that correlates expressions including at least one condition on at least one attribute in the table to corresponding characters;
map, using the stored map, rows of the table to corresponding characters, wherein the mapping produces a string of the characters, wherein the mapping comprises evaluating the expressions against values of the at least one attribute in corresponding ones of the rows of the table, identifying respective ones of the characters according to the evaluating, and adding the identified characters to the string;
receive a query to identify a pattern in the table; and
perform a string search in the string of characters to process the query to find the pattern.

21. The database system of claim 20, wherein the query specifies a search for the pattern that includes a sequence of consecutive predetermined characters, wherein performing the string search comprises performing the string search in the string for the sequence of consecutive predetermined characters.

22. The database system of claim 20, wherein the string of characters is in a collection that is separate from the table, and wherein processing the query comprises performing the string search in the string of characters rather than a search in the table.

23. The system of claim 20, wherein the evaluating comprises:
determining that a first of the rows satisfies a first of the expressions, and determining that a second of the rows satisfies a second of the expressions; wherein the identifying comprises:
identifying a first of the characters for the first table row, and
identifying a second of the characters for the second table row; and
wherein the adding comprises adding the first and second characters to the string.

* * * * *